Feb. 15, 1944.   G. R. CUNNINGTON   2,341,978
METHOD OF MAKING DECORATIVE TRIM PANELS
Original Filed May 25, 1938   2 Sheets-Sheet 1
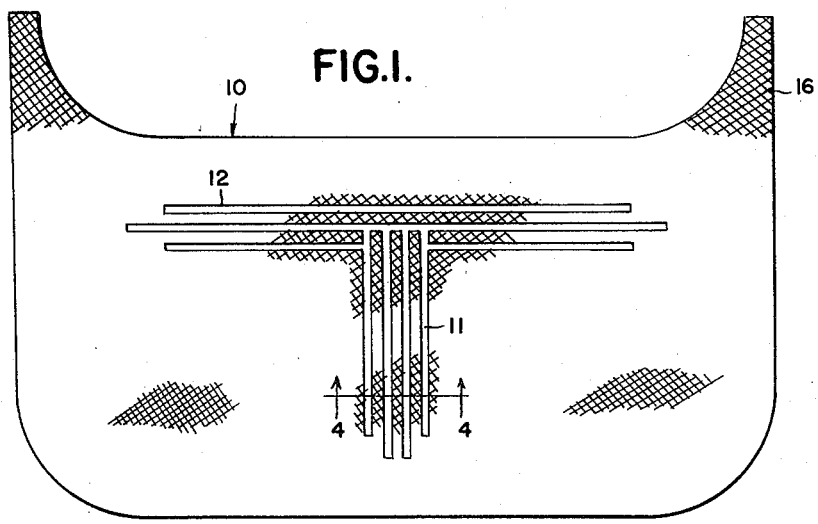
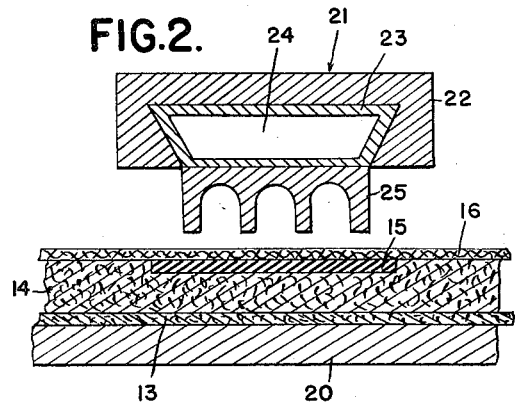
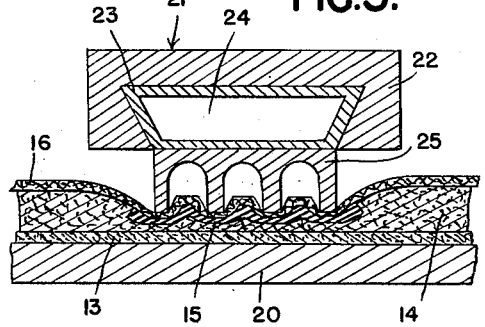
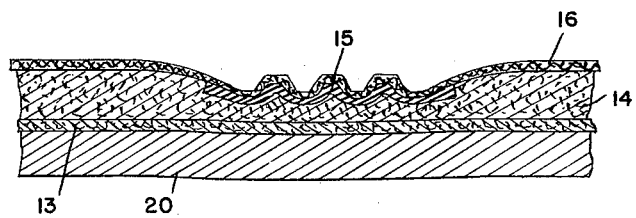
INVENTOR.
GEORGE R. CUNNINGTON
BY
Whittemore, Hulbert & Belknap
ATTORNEYS Feb. 15, 1944.    G. R. CUNNINGTON    2,341,978
METHOD OF MAKING DECORATIVE TRIM PANELS
Original Filed May 25, 1938    2 Sheets-Sheet 2

INVENTOR.
GEORGE R. CUNNINGTON
BY *Whittemore, Hulbert & Belknap*
ATTORNEYS

Patented Feb. 15, 1944

2,341,978

UNITED STATES PATENT OFFICE 2,341,978

METHOD OF MAKING DECORATIVE TRIM PANELS

George R. Cunnington, Grosse Pointe Park, Mich., assignor to National Automotive Fibres, Inc., Detroit, Mich., a corporation of Delaware Original application May 25, 1938, Serial No. 210,034. Divided and this application June 26, 1939, Serial No. 281,249

3 Claims. (Cl. 154—2)

The present invention relates to decorative trim panels and more particularly to a novel decorative trim panel covered with a trim fabric carrying a relief design, and the method of making the same. Efforts to provide decorative trim panels in the past have not met with any considerable success due to a number of difficulties which were never satisfactorily overcome. Trim panels in the past have been decorated by providing an intermediate ply of an embossable board which was embossed to impart a predetermined design thereto, after which a trim fabric was adhered to the board. In other cases fibrous material was placed on a panel board; was impregnated with suitable material, such as latex or resin; and was embossed to form a desired design, after which a trim fabric was placed over the board and caused to conform to the design imparted to the fibrous material. In other cases preformed risers have been adhered to boards and the trim fabric adhered or sewed over the risers.

Difficulty has been had in causing a firm bond between the trim fabric and the panel board, and all of the methods previously employed have had the inherent difficulty that it was impossible to produce designs characterized by fineness of detail. According to the present invention I provide a novel method of making a trim panel which results in a decorated panel characterized by both the fineness of the design which may be imparted thereto and further by the permanence of the decoration. Other advantages of my trim panel reside in the fact that the high portions of the relief design are formed or backed by soft resilient material which minimizes wear, and which further enhances the appearance and feel of the panel.

With the foregoing general remarks in view, it is an object of the present invention to manufacture trim panels in which the trim fabric has a permanent relief design imparted thereto by the medium of a moldable resilient material permanently bonded to the fabric.

It is a further object of the present invention to provide a trim panel having a trim fabric provided with a relief design therein through the medium of molded soft rubber vulcanized to the rear of the fabric.

It is a further object of the present invention to manufacture trim panels by a method which is characterized by the step of molding a moldable medium between the panel board and the trim fabric directly through the trim fabric.

Other objects of the invention will be apparent as the description proceeds, and when taken in conjunction with the accompanying drawings wherein:

Figure 1 is an elevation of a trim panel decorated according to the present invention;

Figure 2 is a sectional view illustrating one method of decorating a trim panel with the decorating mechanism shown in inoperative position.

Fig. 3 is a view corresponding to Figure 2 with the mechanism moved into operative position.

Figure 4 is a fragmentary sectional view on the line 4—4, Figure 1;

Figure 5:
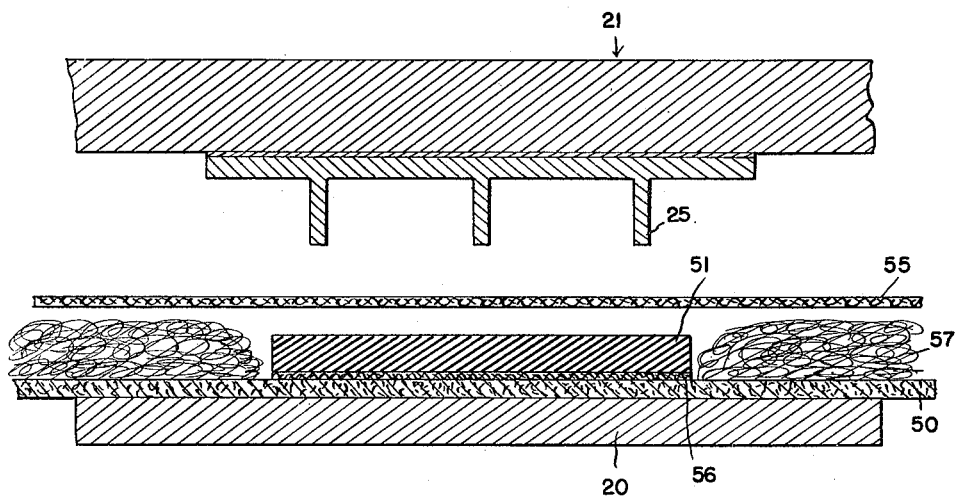
Figure 5 is a sectional view illustrating another method of decorating a trim panel with the decorating mechanism shown in inoperative position.

Trim panels of the type referred to are universally used in decorating the interior of automotive bodies, and for other uses, such for example as in airplanes, trains, and are further used in other interior decoration.

Trim panels essentially comprise a panel board of predetermined outline adapted to be applied over a corresponding area of wall space. The panel board is covered with a trim fabric, and generally it is preferred to provide a resilient padding material, such for example as loosely aggregated cotton or the like between the panel board and the fabric. This provides a richness of appearance and in addition renders the panel soft to the touch.

I refer throughout this application to a trim fabric, and by this I mean a conventional upholstery fabric, such for example as mohair, broadcloth or the like. However, I desire to emphasize the fact that the invention is not limited to these conventional upholstery materials, as it may be practiced with equal facility with other materials, such for example as leather, artificial leather, certain types of paper, as well as other fine fabric, such for example as satin, linen and the like.

By way of specific example I will define particularly the method of manufacture of an automotive trim panel, and for this reference is had to Figure 1 in which the panel generally indicated at 10 is shown as having a design imparted thereto comprising a plurality of horizontal ribs or risers 12, and a plurality of vertical ribs or risers 11. The panel board may be an ordinary KB board, or, if preferred, may be any type of fibrous board, or other materials, such for example as metal.

The trim fabric which I have indicated at 16 is applied over one surface of the board with its edges secured to the back of the board, preferably by adhesion.

As previously stated, it is ordinarily preferable to interpose a relatively thick ply of fibrous material, which I have indicated at 14 in some of the figures, between the board and the fabric.

It is desired to decorate the exposed surface of the trim fabric 16 by applying thereto a relief design in which certain portions of the design are in elevated relation and certain other portions of the design are in depressed relation. It is further desired to impart this design to the cloth without impregnating the cloth with a material which would cause it to change its appearance, and it is further essential to accomplish the foregoing by a medium which will resist cleaning fluid and the like.

Briefly described, I impart this decoration to the trim fabric 16 by interposing between the panel board and the trim fabric an area of material which has certain desirable characteristics. The characteristics necessary for the successful practice of the present invention are as follows: The material must be moldable in the sense that under pressure it will mold or flow and conform to a predetermined design. The material must further be affected by the treatment employed so that it sets into a resilient elastic material which strongly retains its molded form. The material must further adhere strongly to the fabric so as to have therewith a substantially permanent bond. The material must further be substantially incompressible in the sense that there will be no substantial change in volume of the material upon application of molding pressure. Uncured rubber stock, while plastic or semi-plastic, is incompressible in this sense. I have found that an uncured rubber compound answers all of the necessary requirements, and therefore rubber is a preferred form of material to be employed in the present method.

I call attention to the fact, however, that other materials may be employed, for example certain resins fulfil the necessary qualifications to greater or less degrees, and certain compositions of matter embodying resins and including other filler material may be employed.

While I refer at many places in the specification to rubber, it is to be understood that equivalent materials may of course be substituted. Furthermore, when I refer to rubber, I refer to compounds which include a large percentage of rubber, but which may vary widely in the compounding ingredients. The rubber employed may be virgin rubber, reclaimed rubber, synthetic rubber, or appropriate mixtures of the three.

Merely by way of example, I have obtained eminently satisfactory results in a compound comprising approximately 50% new rubber, 30% reclaimed rubber, the balance vulcanizing agents, accelerators and suitable fillers. Certain types of resins, such for example as Bakelite, various cellulose nitrate compounds, or acetate compounds, or urea formaldehyde compounds have some properties which permit their use in the foregoing method. While none of these will produce a panel which is as desirable as that produced by the use of rubber, as specified above, they will in some cases produce panels which have properties and advantages not generally possessed by those known to the prior art.

Figure 6:
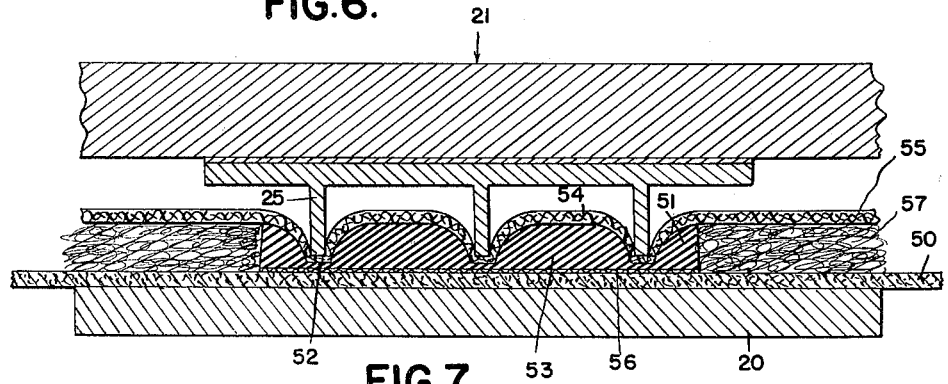
Figure 6 is a view corresponding to Figure 5 in which the mechanism has been moved into operative position.
Figure 7:
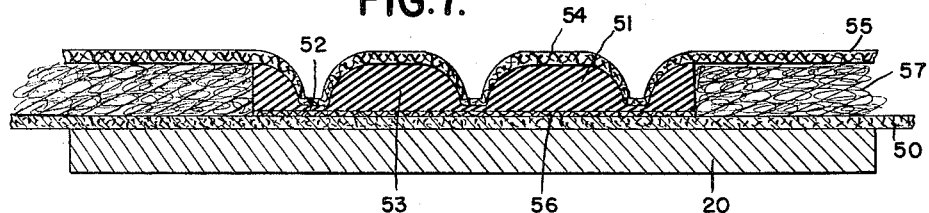
Figure 7 is a sectional view corresponding to Figure 4 showing the decorated trim panel when made according to this embodiment of my invention.

In order to impart a decoration such as indicated at 11 and 12 to trim fabric 16, I provide strips or areas of uncured rubber which I have indicated at 15 in Figures 2 to 4, and 51 in Figures 5 to 7. The rubber may be relatively thin. I prefer to employ a strip of rubber having a thickness from between .005 to .030 inches. While in some cases it may be desirable to use either thicker or thinner plies of rubber, the results are basically the same and differ in degrees only with the amount of rubber employed.

Referring first to Figures 2, 3 and 4 which illustrate one method in which the invention may be carried out, the rubber at 15 is abutted against the rear surface of the trim fabric 16 and rests loosely upon the upper surface of the padding material 14. In the process the rubber is never attached to the padding material 14, and if desired may have at its rear surface a sheeting which is normally provided with the rubber as it is supplied in roll form.

In assembling the panel as it is illustrated in Figure 2, padding material 14 is first applied to the panel board 13 and the cover fabric is placed over the padding material. The rubber strip or area 15 may be temporarily secured to the rear of the cover fabric 16 or it may be positioned in proper location on the upper surface of the padding material 14. The trim fabric 16 is then drawn tightly over the panel board and its edges are reflected rearwardly around the edges of the board and adhered or secured to the rear surface thereof. The assembly is then placed on a plate or platform 20 beneath a die assembly generally indicated at 21. The die assembly comprises the depending die elements 25 which are in thermal conducting relation with a conduit 23 having a passage 24 therein for the reception of a heating fluid, such for example as steam. Obviously other heating means may be employed, such as electrical resistances or the like. The conduit 23 is received within a movable block 22 which is vertically mounted for movement toward and away from the table 20.

The panel assembly comprising the panel board 13, padding material 14, rubber 15, and trim fabric 16 is then placed on the table 20 in accurately predetermined position. Preferably, for this purpose, suitable jigs are provided which insure accurate positioning of the assembly beneath the die elements 25 so that the design formed thereby will bear invariable relation to the assembly.

The next step in the operation is to relatively move the table 20 and the die assembly 21 toward each other, as indicated in Figure 3. This is ordinarily most conveniently done by causing the die assembly 21 to be lowered into engagement with the fabric 16. A substantial amount of pressure is applied, causing a substantial compression of the padding material 14 beneath the rubber 15, as well illustrated in Figure 3. The pressure is sufficient and is accompanied by sufficiently elevated temperatures so that the rubber is first softened and caused to mold and flow to the position shown in Figure 3. Reference to this figure will show that directly beneath the die elements 25 the rubber is reduced in thickness, the excess rubber being displaced laterally into position beneath portions of the design which are intended to be elevated in the finished product. In addition to this molding of the rubber as thus far described, there is a further deformation of the rubber into a generally sinuous shape (according to the particular decoration imparted). In other words, portions of the padding material which underlie the rubber and which are laterally spaced from the depending die elements 25 cause a bodily upward displacement of the rubber intermediate the depending die elements.

The parts are retained in the relative position shown in Figure 3 for a substantial interval sufficient to cause the rubber to become vulcanized. It is unnecessary to complete the cure of the rubber since by properly compounding the rubber the cure will be completed at ordinary temperatures after discontinuation of heat and pressure from the die elements 25. I have found that by properly compounding the rubber the cure may be completed in from thirty seconds to a few minutes. It is necessary to recognize also that the rubber compound must be such that it will not soften sufficiently under heat encountered to cause it to penetrate the fabric. Numerous rubber compounds satisfy the condition set forth and will immediately suggest themselves to those familiar with the art.

Upon removal of the die assembly 21 from the panel assembly, the parts assume the position illustrated in Figure 4, which is the final condition of the product. Note in this figure that the fibrous padding material beneath the rubber 15 has recovered a substantial part of its uncompressed condition. The beads or risers which have been formed in the fabric are retained therein by means of the rubber. As will be evident, these beads or risers will be soft, resilient, and elastic. They may be temporarily pressed out of shape and will immediately resume their original conformation. Further, due to the fact that the material which forms the risers is soft and resilient, the fabric 16 over these areas will withstand considerable wear. This is to be contrasted with the conditions where any wear of the decorated portions results in destruction of the fabric.

In Figures 5 to 7 I have illustrated a different and in many ways preferred form of my invention. In these figures I have illustrated the mechanism for decorating the panel as the same as illustrated in Figures 2 to 4; namely, a table 20 and a die assembly including depending die elements 25. In these figures I have omitted illustration of the heating means for the depending die elements 25, and it will be understood that these may be any convenient heating means. It may be mentioned at this time that the temperatures employed are necessarily relatively low for the reason that the heat transferred to vulcanize the rubber must pass through the fabric. The temperatures selected therefore are such that they will not injure the fabric.

In Figure 5 I have shown a portion of a panel board at 50, padding material at 57, trim fabric at 55, and rubber at 51. According to this embodiment of the invention the panel elements are assembled according to the following procedure: The padding material which may be in the form of a thin film or web of loosely aggregated cotton is applied so as to substantially cover one complete surface of the panel board. It is subsequently treated in a manner to remove padding material from the area to be decorated. The rubber 51 is then adhesively secured to the area of the panel board 50 from which the padding material 57 has been removed.

In Figure 5 I have indicated at 56 a sheeting initially attached to the rubber strip 51, and which is employed in adhesively securing the rubber to the panel board.

The cover fabric 55 is next secured over the panel assembly and its edges are reflected rearwardly and adhesively or otherwise secured to the rear surface of the panel board. The fabric is only moderately tensioned at this time, and, if preferred, a certain amount of looseness or slack may be left therein.

The assembled panel is next placed upon the table 20 and the heated die elements 25 are lowered into contact therewith, as illustrated in Figure 6. The rubber 51, due to the influence of heat and pressure as supplied by the die elements 25, is first softened and is then caused to mold and flow to the configuration shown in Figure 6. In this figure I have illustrated the rubber directly beneath the depending die elements 25 as substantially reduced in thickness, as indicated at 52. The rubber which is displaced from beneath the depending die elements 25 is caused to be laterally displaced into the intervening areas, causing an increasing thickness in the bead or riser portion 53. The application of heat and pressure is continued for an interval sufficient to cause at least substantial vulcanization of the rubber, so that upon removal of the die elements it retains its molded form and in addition is permanently bonded by vulcanization to the trim fabric 55.

In some instances the bond between the rubber 51 and the panel board 50 may be temporary in nature, until vulcanization takes place, at which time there may be a vulcanized bond set up between the panel board and the rubber.

As well indicated in Figure 6, the operation takes up considerable slack in the fabric 55 in deforming it over the elevated portions 53 and causing it to conform to the depressed portion 52 of the rubber. If initially slack is provided in the fabric 55, it may be taken up so that the fabric in the final condition is substantially tensioned. If the fabric is initially tensioned, the forming operation results in a further tension of the fabric, with the result that the completed fabric presents a smooth appearance. In Figure 7 I have illustrated the completed product after the removal of the die elements 25, and in this figure the parts thereof have been given figures as in the preceding views.

It is desired to emphasize the simplicity of the operations which embody the present invention. It is unnecessary to provide for extreme accuracy of registration between the die elements and the trim panel, since the die element is adapted to form the design in the fabric at whatever area it contacts. This is to be contrasted to prior practice in which the designs have been supplied in one manner or another to the panel board, after which the trim fabric was applied. In such case it is necessary to form trim fabric over the design elements manually, or to exercise extreme care, causing forming elements to register with the already formed design elements.

Furthermore, the present method lends itself admirably to the reproduction of designs characterized by extreme fineness of detail. In the illustrations I have shown simple designs consisting of elongated risers, but in practice these designs may take almost any conceivable conformation. I have found that it is possible to reproduce designs having a fineness of detail which is limited only by the type of fabric employed.

Another important consideration which is particularly applicable to certain types of fabric is that the pressure which is applied to the fabric in the formation of the design is limited to those areas which in the completed design are to be the depressed portions. Thus the beads or risers 54 shown in Figures 6 and 7 are formed without bringing any elements into contact with the exterior surface of the fabric 55. If the fabric is mohair, or other nap fabric, the operation does not break down the nap. On the other hand, in the depressed portion of the design, where the die elements come into contact with the cloth, the nap may be broken down, and if it is, this merely enhances the ultimate effect for the reason that it increases the contrast between the elevated and depressed portions of the design.

This application is a division of my application, Serial No. 210,034, filed May 25, 1938, entitled "Decorative trim panel and fabric."

While I have illustrated and described several specific embodiments of my invention, it will be apparent to those skilled in the art that various additions, modifications, omissions, combinations and substitutions may be made which will be within the spirit and scope of my invention as defined by the appended claims.

What I claim as my invention is:

1. The method of making a decorative trim panel, comprising the steps of assembling in surface to surface relation a solid formed layer of uncured rubber between a fabric sheet and a relatively stiff panel board, applying pressure to the fabric sheet at spaced points thereof to form alternate depressed and elevated portions in the fabric sheet and simultaneously to compress portions of the uncured rubber beneath the depressed portions of said fabric sheet and to displace other portions of said uncured rubber into the elevated portions of said fabric sheet, and heating the depressed portions of said fabric sheet and the compressed portions of said uncured rubber while subjected to pressure as aforesaid to vulcanize the compressed portions of the rubber to the depressed portions of the fabric sheet and to adjacent portions of the panel board to thereby maintain the relationship aforesaid between the displaced rubber and the elevated portions of the fabric sheet.

2. The method of making a decorative trim panel, comprising the steps of assembling a substantially flat solid layer of uncured rubber in surface to surface relation between a fabric sheet and a relatively stiff panel board, applying sufficient pressure to the fabric at a plurality of spaced areas to displace all but thin films of rubber into adjacent raised riser portions intermediate said areas of pressure application, leaving the fabric intermediate and adjacent said areas of pressure application free for unrestricted outward displacement by the formation of said riser portions whereby said fabric cooperates with the pressure means to shape said riser portions and is smoothly tensioned thereover, and heating said rubber while maintaining the application of pressure to vulcanize said riser portions and to provide a vulcanized bond between said films of rubber and said fabric and said panel board at the areas of pressure application.

3. The method of making a decorative trim panel, comprising the steps of assembling a solid formed layer of uncured rubber between a fabric sheet to be decorated and a relatively stiff panel board, positioning the assembly on a support with the fabric outermost, moving a plurality of spaced die elements toward said support into pressure contact with said fabric to displace all but thin films of rubber from beneath said die elements into adjacent risers of increased height intermediate said die elements so that the fabric intermediate said die elements cooperates with the die elements to shape said risers and is smoothly tensioned thereover, heating said rubber while maintaining pressure on said die elements to vulcanize said rubber in its molded shape and to bond the thin films of rubber beneath said die elements to said fabric and said panel board, thereby retaining said fabric tensioned over and bonded to said formed riser portions.

GEORGE R. CUNNINGTON.